S. WISHARD.
CORN-PLANTER.
No. 171,462. Patented Dec. 21, 1875.
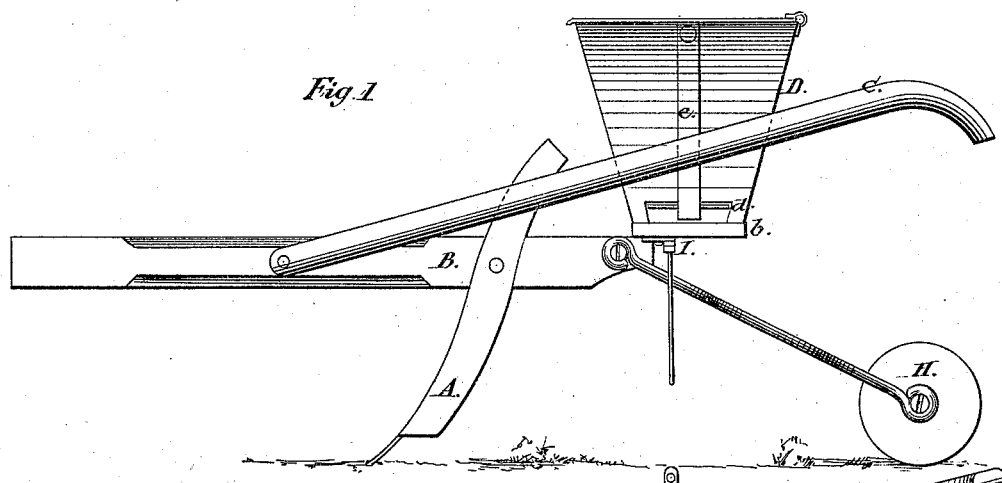
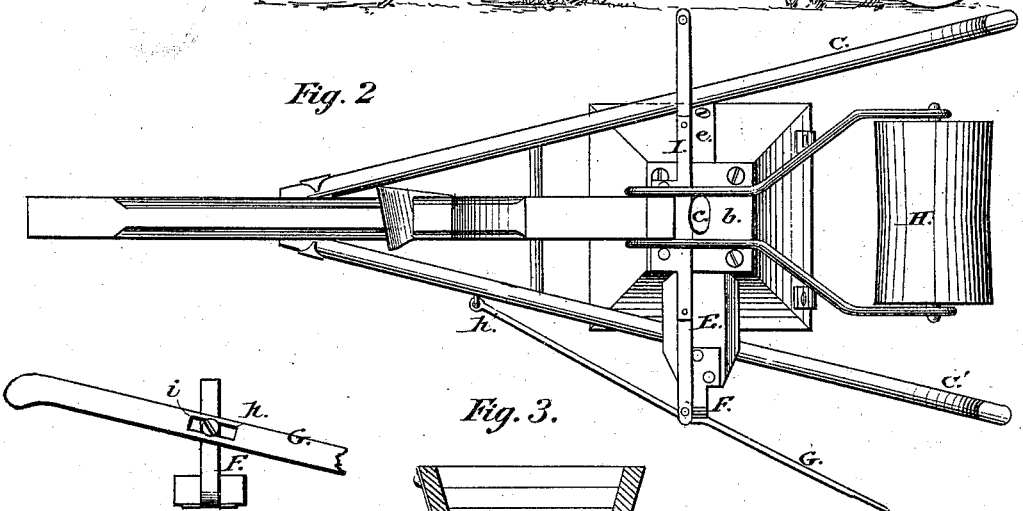
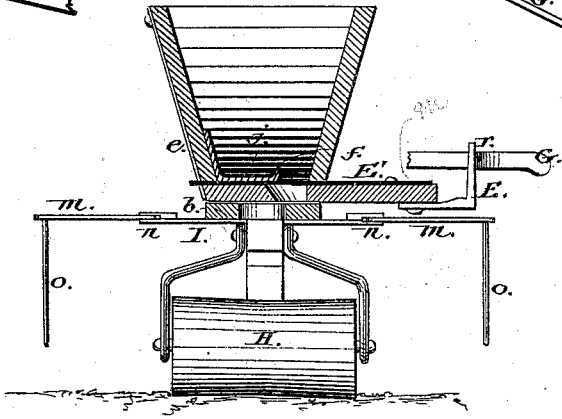
WITNESSES
INVENTOR
Stewart Wishard
Attorney

UNITED STATES PATENT OFFICE.

STEWART WISHARD, OF GURLEY'S TANK, ALABAMA.

IMPROVEMENT IN CORN-PLANTERS.

Specification forming part of Letters Patent No. 171,462, dated December 21, 1875; application filed March 3, 1875.

*To all whom it may concern:*

Be it known that I, STEWART WISHARD, of Gurley's Tank, in the county of Madison and State of Alabama, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to certain improvements in the construction of corn-planters used in connection with plows and cultivators, the object of which is to enable the corn-planting device to be attached to any marking-plow or cultivator in such a way that no part of it is fixed permanently to the plow with which it is used, but the whole may be fixed to or detached therefrom expeditiously and without disturbing any part of the plow. Another object of the invention is to enable the planter or operator to drop the grain at proper intervals, and in parallel lines, so as to secure regularity in the squares or checks in which the grain is planted. It consists in constructing the hopper for holding the grain with a reciprocating valve operated by a spring fixed to the hopper and a lever connected directly with the valve under the control of the operator. It further consists of adjustable guides arranged transversely to the hopper and the plow, which enable the operator to run the rows in parallel lines, and to drop the grain at proper intervals.

Figure 1 is an elevation of the planter attached to the plow. Fig. 2 is a bottom plan of the same. Fig. 3 is a vertical transverse section. Fig. 4 is a detailed view of the lever and its bearing.

A is the plow. B is the beam, and C C' are the handles thereof. D is the hopper for holding the grain. It is placed on the rear end of the plow-beam, between the handles C C', and fixed thereon by a bolt passed through an extension of the bottom $b$. The hopper-bottom is provided with an opening, $c$, through which the grain falls. To prevent scattering, a boot or pipe may extend from the opening nearly to the ground in the rear of the plow. The sides of the hopper are provided with slots or mortises, $d$, near their lower edge, through which is passed, so as to form a movable bottom, the valve E. This valve abuts against the flat spring $e$, secured to one side of the hopper, which is designed to keep the valve closed. The valve is a rectangular block of wood, with a slot, $e'$, to receive the grain, which, when it is pressed upon by the spring $e$, is kept from dropping by the bottom $b$, but when the valve is moved against the spring the grain falls through the mortise $c$. A metal plate, E', with a slot, $f$, is adjusted to the upper side of the valve, so that the slot falls over the slot in the valve. The plate being secured to the valve by a set-screw, it may be adjusted so as to regulate the size of the slot $f$, and thereby limit the number of grains falling through into the receptacle $e'$ in the valve. The end of the valve opposite the spring is provided with an elbow, F, having a stud, $h$, on its upper end, which serves as a sliding bearing for the lever G, which is straight, and fastened at one end to the plow-handle, as at $h'$, and secured to or resting on the elbow F, where it is retained by the stud $h$ passing through the slot $i$. This arrangement enables the operator to reciprocate the valve E by means of the lever G, ample room being allowed for the movement of the latter on the stud $h$ by the slot $i$.

The operation of the device is as follows: The operator holds the plow-handles, and at the proper intervals presses upon the lever G with his hands. This moves the valve forward until the slot $e'$ comes in line with the mortise $c$, when the grain falls through and down into the trench made by the plow, where it is immediately covered by the coverer H. As soon as the lever is released from pressure the spring forces the valve back, and it is ready for operation again. To prevent the corn from falling through while the valve is being operated the ledge $j$, affixed to the lower part of the interior of the hopper, closes the slot $i$ in the metal plate, and thus only the grain which falls through while the valve is at rest into the receptacle $e'$ is permitted to drop through to the ground.

The places to operate the valve may be judged of by stepping, and moderate regularity be secured; but in order to secure perfect regularity I employ another device, which I will now describe.

I is a bar securely bolted to the bottom of the hopper, so as to be at right angles to the beam of the plow, and of a length not exceeding the space between the handles C C'. The ends n n of this bar are bifurcated. m m are the guide-arms, which are secured in the bifurcated ends n n by bolts, so as to lengthen or shorten to suit the different widths of the corn rows. At right angles to these arms, projecting downward, are the guides o o, which reach nearly to the ground. When the corn is to be planted in squares or checks, and the field has been laid off in one direction, this device is used to indicate the places where to drop the corn, and also to guide the plow, and thus do away with the use of stakes. For this purpose, after the first row has been planted, one of the guides is made to follow this row, and thereby a straight line is run, and the proper distance kept at all times between the rows. By observing the time when the two guides cross the transverse rows and operating the valve simultaneously thereto perfect regularity is secured in the planting.

I am aware that corn-planters have been used in connection with plows, but in none that I am acquainted with is the construction such that the operative parts of the planter are independent of the plow. I do not, therefore, claim, broadly, the use of a corn-planter in combination with a plow; but What I do claim is—

In a walking-planter, the combination of the elbow F with the slotted lever G, seed-valve E, and handle C', substantially as and for the purpose hereinbefore described and set forth.

In testimony that I claim the foregoing I have hereunto set my hand this 11th day of February, 1875.

STEWART WISHARD.

Witnesses:
M. JORDAN,
J. E. HALL.